(12) United States Patent
Delpech de Frayssinet et al.

(10) Patent No.: US 11,914,975 B2
(45) Date of Patent: Feb. 27, 2024

(54) CUSTOMIZED SOFTWARE APPLICATION TEMPLATE-BASED GENERATOR

(71) Applicant: Schneider Electric USA, Inc., Andover, MA (US)

(72) Inventors: François Delpech de Frayssinet, Somerville, MA (US); Kyle Alonso Ramie, Norton, MA (US)

(73) Assignee: Schneider Electric USA, Inc., Andover, MA (US)

( * ) Notice: Subject to any disclaimer, the term of this patent is extended or adjusted under 35 U.S.C. 154(b) by 227 days.

(21) Appl. No.: 17/186,104

(22) Filed: Feb. 26, 2021

(65) Prior Publication Data

US 2022/0276842 A1 Sep. 1, 2022

(51) Int. Cl.
*G06F 8/36* (2018.01)
*G06F 8/65* (2018.01)
*G06F 8/10* (2018.01)
*G06F 8/60* (2018.01)
*G06F 8/71* (2018.01)
*G06F 8/34* (2018.01)

(52) U.S. Cl.
CPC ............... *G06F 8/10* (2013.01); *G06F 8/34* (2013.01); *G06F 8/60* (2013.01); *G06F 8/71* (2013.01)

(58) Field of Classification Search
CPC ..... G06F 8/10; G06F 8/34; G06F 8/60; G06F 8/71; G06F 8/447; G06F 8/36; G06F 8/65
See application file for complete search history.

(56) References Cited

U.S. PATENT DOCUMENTS

| | | | |
|---|---|---|---|
| 8,776,015 B1* | 7/2014 | Hosagrahara | G06F 8/24 717/113 |
| 8,965,831 B2 | 2/2015 | Kaledhonkar et al. | |
| 2009/0006523 A1* | 1/2009 | Kordun | G06F 16/958 709/202 |
| 2015/0043039 A1* | 2/2015 | Eschbach | G06K 15/1889 358/3.28 |
| 2016/0070813 A1* | 3/2016 | Unter Ecker | G06F 16/958 715/234 |
| 2016/0231870 A1* | 8/2016 | Summa | G06F 3/0481 |
| 2017/0147335 A1* | 5/2017 | Parees | G06F 8/30 |
| 2017/0364336 A1* | 12/2017 | Khan | G06F 40/35 |

(Continued)

*Primary Examiner* — Chat C Do
*Assistant Examiner* — Noor Alkhateeb
(74) *Attorney, Agent, or Firm* — Locke Lord LLP

(57) ABSTRACT

A method includes receiving, by interacting with a graphical user interface (GUI) of a remote user device, a request to generate a software application, the request identifying a set of opinionated group guidelines (OGGs) and a platform, selecting template modules for the application based on the identified OGG set and platform, each template module having user configurable templates and business rules, selecting from the templates, and soliciting user input via the GUI for template parameters of the selected templates, wherein selecting from the templates and solicitation of the user input is based on the identified OGG set and business rules of the corresponding template module. The method further includes completing the selected templates based on the solicited user input, generating a file executable by the platform for each of the completed templates, and outputting an application folder in response to the request, the application folder structure including the files.

20 Claims, 7 Drawing Sheets

(56) References Cited

U.S. PATENT DOCUMENTS

| | | | |
|---|---|---|---|
| 2018/0181584 A1* | 6/2018 | Bestler | G06F 16/134 |
| 2018/0260301 A1* | 9/2018 | Podjarny | G06F 16/2379 |
| 2019/0243665 A1* | 8/2019 | Bolik | G06F 8/60 |
| 2020/0007556 A1* | 1/2020 | Brebner | G06F 16/958 |
| 2020/0319879 A1* | 10/2020 | Ghosh | G06F 8/77 |
| 2021/0064361 A1* | 3/2021 | Jayaraman | G06F 8/30 |

* cited by examiner

CUSTOMIZED SOFTWARE APPLICATION TEMPLATE-BASED GENERATOR

TECHNICAL FIELD

The present disclosure relates to software application generation, and more particularly, to a customized software application template-based generator that satisfies specified opinionated group guidelines.

BACKGROUND

Software application generation for an enterprise, such as an organization, government body, educational system, corporation, etc., involves complex engineering tasks for compliance with requirements for the enterprise, such as software architecture, security, user experience (UX), user interface (UI), level of testing, security, accessibility requirements, page layout, style, etc. Software application drafters need sufficient know-how and skill to write software code for the software application (also referred to as an application) that complies with the many requirements. This bars members of the enterprise that do not have the requisite engineering skills from drafting applications. Since each application is drafted from scratch, significant effort and time is used for writing each application. Furthermore, when an existing application is modified, such as to add or change a component or for compatibility with a new platform, significant engineering skill is needed to implement the modification. Furthermore, there can be significant discrepancies between the quality of various applications drafted by different application drafters. Some application drafters may fall short of coding guidelines, and inconsistencies can creep in between the applications. The inconsistencies can be challenging or bothersome to users and/or below the enterprise's standards.

Furthermore, when the enterprise revises any of its requirements, an existing application will be either noncompliant with the revised requirements, or substantial engineering work is needed to revise the existing application for rendering the existing application compliant. What is more, communicating changes in the enterprise's requirements can lead to miscommunications or different interpretations by communication recipients.

While conventional methods and systems have generally been considered satisfactory for their intended purpose, there is still a need in the art for a tool to reduce the skill and time needed for drafting or modifying applications while ensuring consistency with enterprise requirements, and to address challenges associated with revising or implementing revisions to enterprise requirements. The present disclosure provides a solution.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method including receiving, by interacting with a graphical user interface (GUI) of a remote user device, a request to generate a software application executable on at least one platform of multiple possible platforms. The request including identification of a set of opinionated group guidelines (OGG set) for the software application and identification of the at least one platform. The method further includes selecting a group of one or more template modules from a plurality of template modules based on the identified OGG set and the identified at least one platform. Each template module is dedicated to configuring a different aspect of the software application. The respective template modules each have an associated collection of templates and business rules, wherein the templates of the collections of templates and the business rules associated with the plurality of template modules are each configurable by an operator. For each template module of the selected group of one or more template modules, templates are selected from the associated collection of templates based on the identified OGG set and business rules of the template module. For each selected template, user input is solicited via the GUI for the selected template's template parameters. Solicitation of the user input is based on the identified OGG set and the business rules of the corresponding template module. The method further includes completing the selected templates based on the solicited user input, generating a file for each of the completed templates, wherein the files are generated to be executable by the at least one platform identified, and outputting an application folder structure in response to the request, wherein the application folder structure includes the files.

In one or more embodiments, soliciting the user input via the GUI for template parameters of one of the selected templates can include accessing a collection of libraries storing parameter information for templates of the template collections associated with the plurality of template modules of the templates, wherein the collection of libraries can be configurable by the operator after deployment, selecting candidate parameter information of the stored parameter information that are designated by the business rules associated with the template module, and prompting a user via the GUI to make selections from the candidate parameter information incorporating the selections into the template.

In one or more embodiments, the template parameters can include application name, layout type, page names for one or more displayable pages to be generated upon execution of the corresponding file based on the corresponding template, and properties for each of the one or more displayable pages.

In one or more embodiments, the files can be configured to be edited at a command level after being provided with the application folder structure.

In one or more embodiments, the selected group of one or more template modules can include modules for configuring authentication and/or authorization for executing the software application, pre-configuring access to data sources for accessing data, configuring deployment of the software application, configuring data storage for storing data during execution of the software application, and configuring one or more displayable pages to be generated upon execution of the software application.

In one or more embodiments, the opinionated group guidelines can define at least one characteristic of the software application, the at least one characteristic selected from the group of characteristics including user experience (UX), user interface (UI), level of testing, security, architecture, and accessibility.

In one or more embodiments, the request can further include a style selection that selects from a plurality of candidate styles, and the group of one or more template modules is selected based on the style selection.

In one or more embodiments, the method further includes receiving an application update request, the application update request requesting an update to an existing application folder structure that was previously output, wherein the application update request can identify one or more new platforms upon which it is desired for the software application that corresponds to the existing application folder structure to execute, one or more software components of the existing application to be updated, and/or one or more software components to be added to the existing application. The method can further include selecting and completing new templates for adding the one or more new platforms and/or the one or more new software components, and/or removing and/or modifying the one or more existing templates of the existing application for updating the one or more software components. The method can further include updating the existing application folder structure by updating files corresponding to the added, removed, and/or updated templates based on the update request, resulting in an integrated application folder structure. The method can further include joining and/or rejoining files of the integrated application folder structure to provide appropriate connectivity between files in the integrated application folder that were affected by the updating.

In one or more embodiments, the method can further include receiving an update from an operator, after deployment of a system for generating the software application, to at least one of the collection of libraries, the collections of templates associated with the group of template modules, available opinionated group guideline sets, and business rules associated with the group of template modules, receiving a second request to update a previously outputted application folder structure based on the update, and updating the previously outputted application folder structure in response to the second request and in accordance with the updates.

In one or more embodiments, the at least one platform can include one or more of a mobile platform, a desktop platform, a web platform, a server platform, and a cloud platform.

In one or more embodiments, generating the file for each of the modified templates can be performed based on the identified OGG set.

In another aspect, disclosed is a software application generator that includes a memory configured to store a plurality of programmable instructions and at least one processing device in communication with the memory. The at least one processing device, upon execution of the plurality of programmable instructions is configured to perform the disclosed method.

In a further aspect, disclosed is a non-transitory computer readable storage medium having one or more computer programs embedded therein. When executed by a computer system, the computer system is caused to perform the disclosed method In one or more embodiments, the at least one processing device, upon execution of the plurality of programmable instructions can be further configured to buffer the processed features of the signals and output contents of the buffer in association with the warning event notification.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

The present disclosure is directed to an application generator that interacts with a graphical user interface (GUI) of a remote user device to generate a customized software application (also referred to as an application) using templates. Based on the type of software application requested to be generated, the application generator can select template(s) to use, business rules to apply for soliciting user input for application parameters to incorporate into the application, and one or more libraries to consult for candidate application parameters and content to incorporate into the application. The application generator modifies the template based on the solicited user input, generates a file for each of the modified templates, and outputs a folder structure that includes the files. The files are executable software modules.

The user device, upon receiving the folder structure, can execute the software modules, unilaterally modify the software modules using line commands, request the application generator to add software modules to the software application, and/or upgrade the software modules based on revisions to the libraries or templates used to create the software module. The application generator can provide options to a user for generating software applications, such as choices of templates or libraries to use and/or choices of platforms on which the application can be used or components to be included The term "platform," as used in this disclosure in relation to an application, refers to the hardware and software combination upon which the application can be executed, such as a mobile device using an OIS™ or Android™ operating system or a desktop device using a Windows™, Linux™ or macOS™ operating system. The term "component," as used in this disclosure in relation to an application, refers to software aspects of the application to be executed, such as layout and selection of widgets, layout of pages, style to be applied, services (e.g., authentication, authorization). Platform and component templates define parameters of a platform and component, respectively, and include parameter fields into which platform information can be inserted. Some of the platform information is determined by a selected opinionated group guideline (OGG) set, and some of the platform information is solicited by the user.

An administrator of the application generator can modify the templates, business rules, and libraries accessed by the application generator. These changes can be made via a user interface, such as a command line interface (CLI), available to the administrator after the application generator has been deployed and at any time during the life of the application generator.

Figure 1:
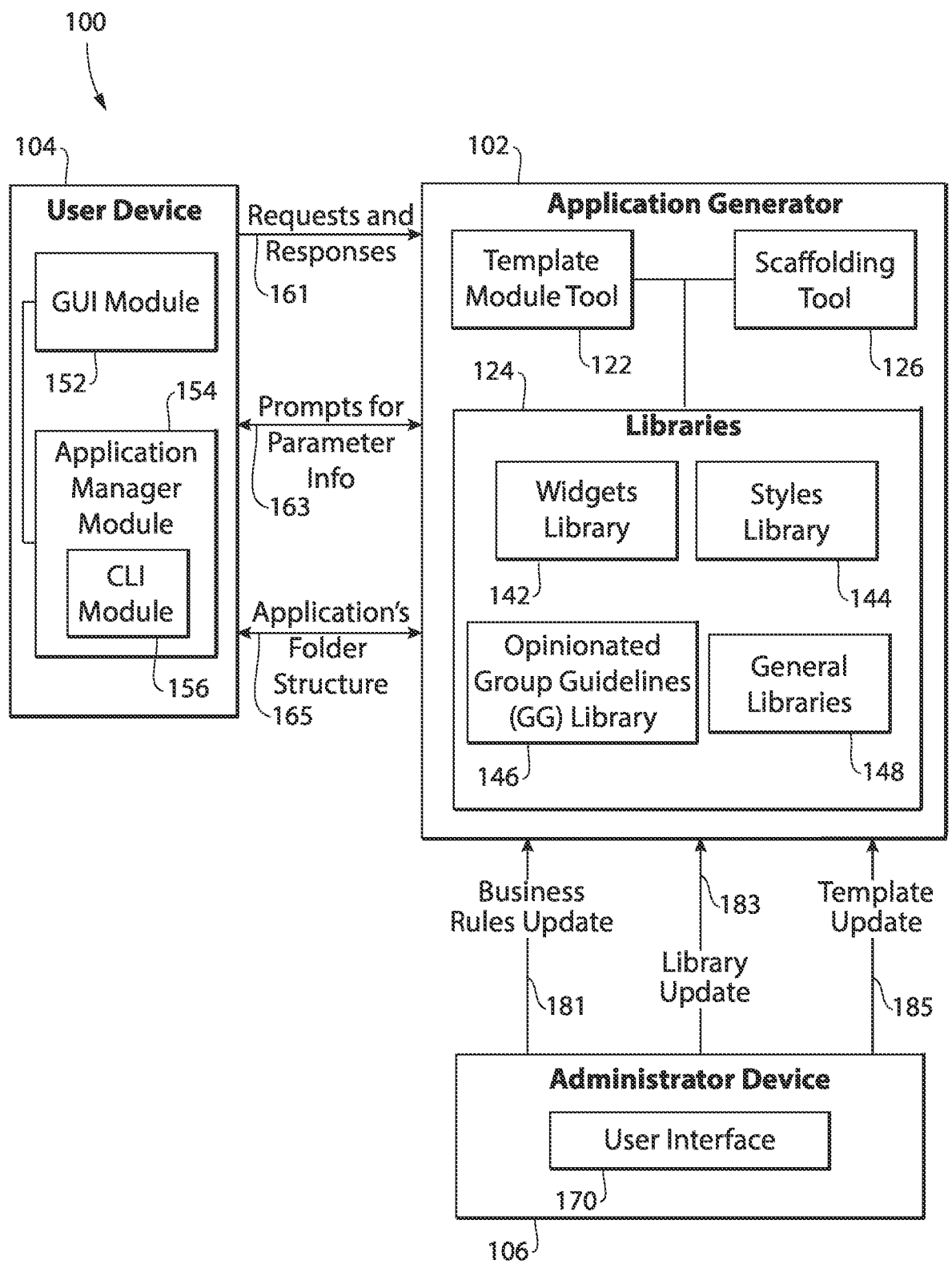
FIG. 1 is a block diagram illustrating a software developing system for developing a software application, in accordance with embodiments of the disclosure.

Reference will now be made to the drawings wherein like reference numerals identify similar structural features or aspects of the subject disclosure. For purposes of explanation and illustration, and not limitation, a schematic diagram of an exemplary embodiment of an application development system in accordance with the disclosure is shown in FIG. 1 and is designated generally by reference character 100. Other embodiments of an application development system in accordance with the disclosure, or aspects thereof, are provided in FIGS. 2-6, as will be described.

Application development system 100 includes an application generator 102 that can communicate with a remote user device 104 and an administrator system 106.

User device 104, which includes a GUI module 152, an application manager module 154, and editor CLI module 156, can be remote from application generator 102. Communication between user device 104 and application generator 102 can be via a network, such as a private network and/or a public network, such as the Internet, using wired and/or wireless communication. GUI module 152 provides a GUI with which a user can interact for communicating with application generator 102, such as by submitting a request to perform a task (e.g., generate, revise, or update) associated with an application, receiving solicitations for information related to the task, submitting responses to the solicitation, and/or receiving the application after performance of the task. The GUI can be displayed by a display device of the user device, and a user can input information to the GUI via a user input device, such as a keyboard, mouse, touchscreen, etc.

The request identifies the task to be performed. When the task is to generate a new software application, a user will be prompted by application generator 102 via the GUI to select an OGG set to be used (if more than one OGG set is available) and request a platform upon which the software application should be executable. The platform requested can be selected from a plurality of available platforms, including device or application platforms, such as a mobile platform, a desktop platform, a web platform, a server platform, and a cloud platform. The user will then be prompted to provide parameter information for parameters of templates selected by application generator 102 to generate the application. The templates and candidate parameter information is selected based on the selected OGG set and platforms.

The software application is generated based on the platform requested by the user. For example, when the platform requested is the mobile platform, the software application is generated as a mobile application that provides an infrastructure to create executable software code that can be installed natively on a mobile device. When the platform requested is the desktop platform, the software application is generated as a desktop application that provides an infrastructure to create executable software code that can be run natively on a desktop operating system (e.g., Windows™, Mac™ and Linux™). When the platform requested is the web application platform, the software application is generated as a web application that provides an infrastructure to create executable software code that can be hosted on a website and accessible from a browser. When the platform requested is the web server platform, the software application is generated as a web server application programmable interface (API) that can receive and handle requests and respond to the requests by delivering data to another web server or to a web application.

When the task is to revise an application, the user is prompted to identify the application(s) and provide the revisions via the GUI, such as addition of a new platform and/or addition of a component, such as a layout component (e.g., one or more pages or widgets, and/or addition of a service component (e.g., authentication, connection, authorization, etc.)). When the task is to update an application, the user is prompted to identify the application(s) and confirm the updates to be applied, such as to update the identified application based on updates to one or more identified libraries 124, described further below.

Application manager module 154 receives the application (once generated, revised, or updated) as an application folder structure from application generator 102, wherein the application folder structure includes executable files, and causes the files to be executed by a processing device of user device 104. Application manager module 154 can use a command line interface provided by an operating system of user device 104 to use the software code included in the application folder structure, which can include execution, testing, and/or building and deploying the software code. Usage of the software code can be controlled and performed on a specific platform (device or application). CLI module 156 is a code editor that provides access to view and edit code, e.g., source code, included in the files of the application's folder structure and an editor for editing the code.

Figure 2A:
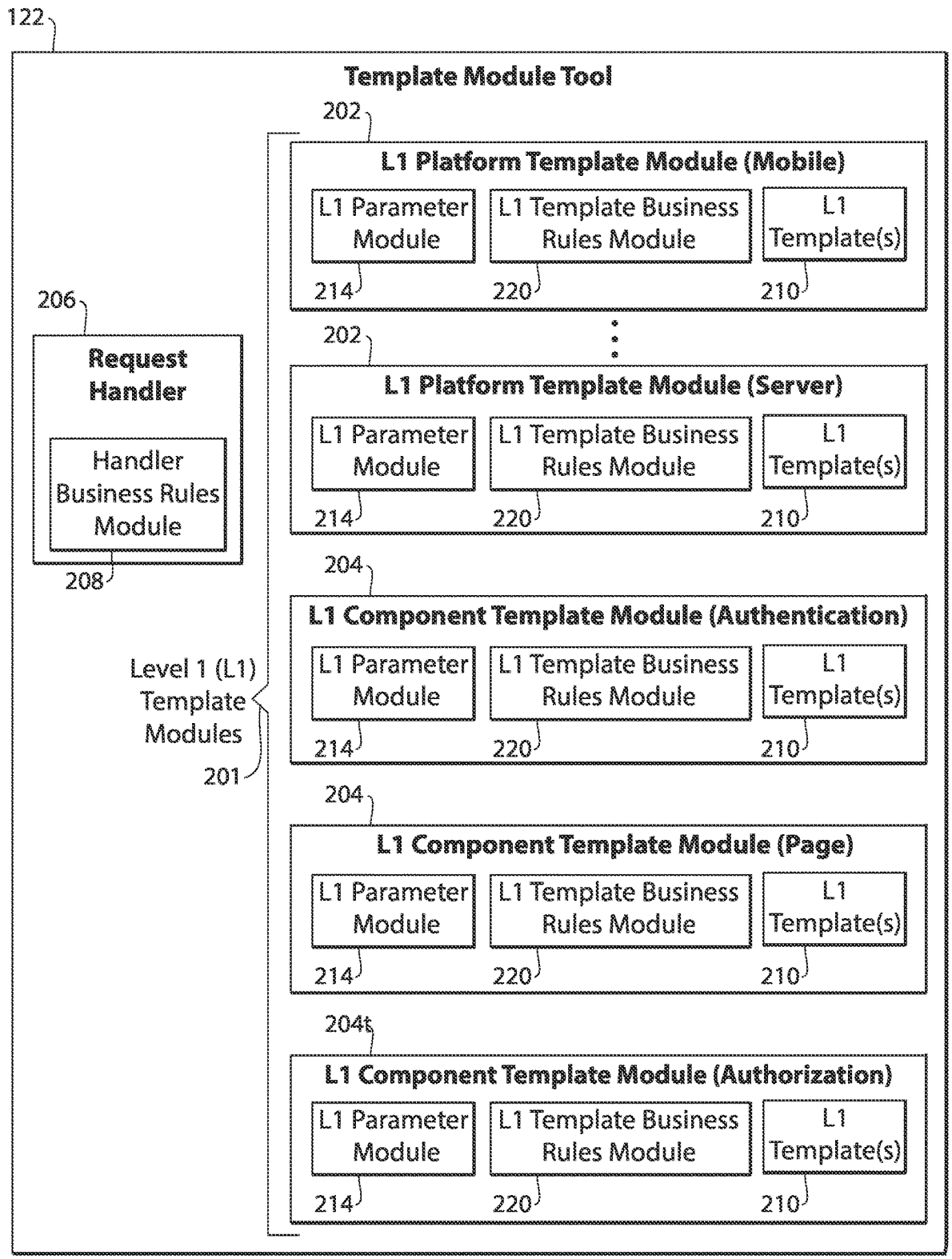
FIG. 2A is a block diagram of a template module tool of the software developing system, in accordance with embodiments of the disclosure.
Figure 2B:
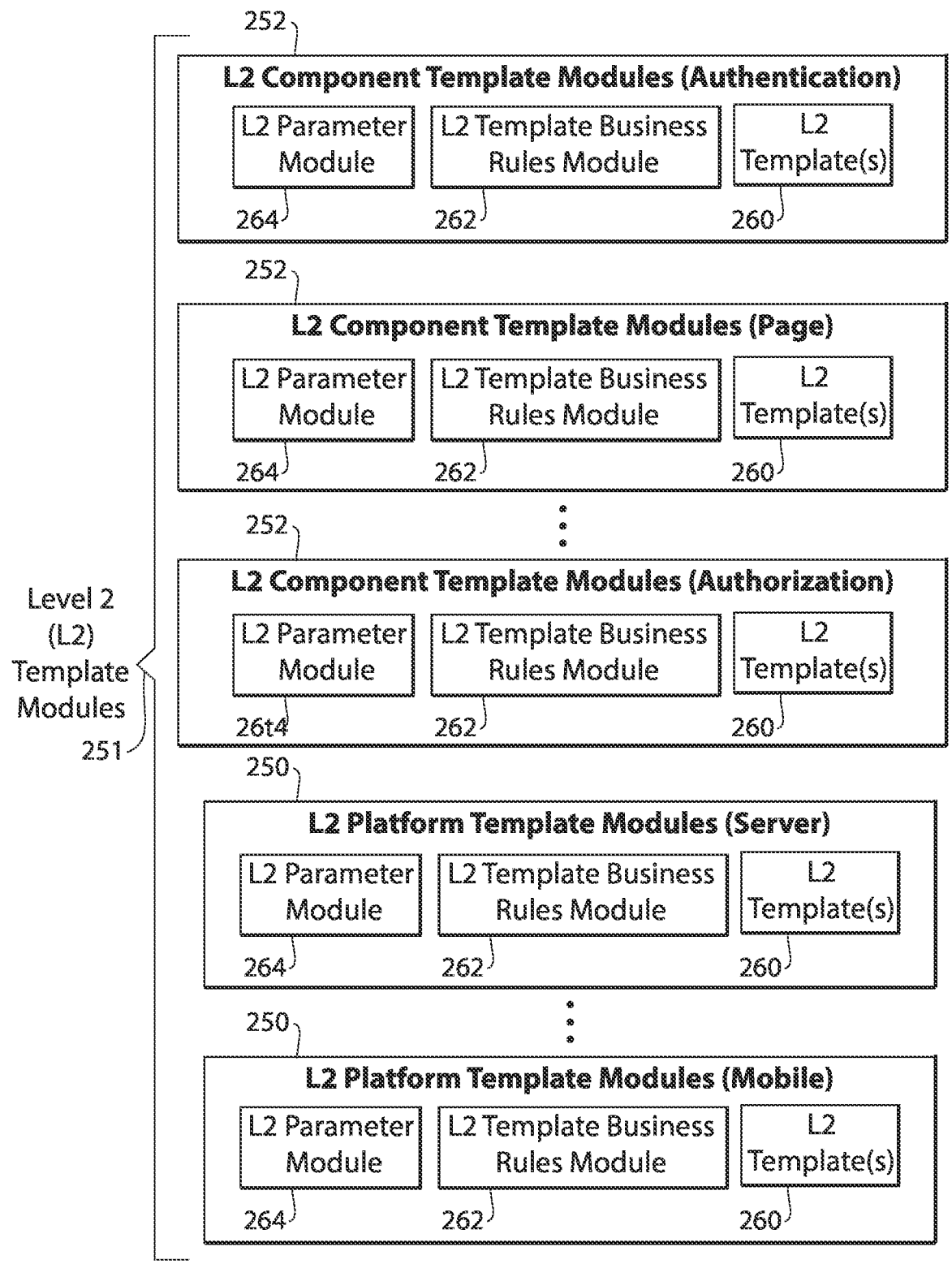
FIG. 2B is a block diagram of a second level of modules of the template module tool, in accordance with embodiments of the disclosure.

With reference to FIGS. 1, 2A, and 2B, application generator 102 includes a template module tool 122, libraries 124, and scaffolding tool 126. Template module tool 122 (shown in greater detail in FIG. 2) includes a request handler 206, a plurality of Level 1 (L1) template modules 201, and a plurality of Level 2 (L2) template modules 251. L1 template modules 201 include L1 platform template modules 202 and L1 component template modules 204, which each include an L1 template collection 210, an L1 parameter module 214, and an L1 template business rules module 220. L1 platform template modules 202 can each invoke one or more L2 component template modules 250. L1 component template modules 204 can each invoke one or more L2 platform template modules 252. L2 component template modules 250 and L2 platform template modules 252 each include an L2 template collection 260, an L2 parameter module 264, and an L2 template business rules module 262. Libraries 124 include a library of widgets 142, a library of one or more styles 144, a library of one or more opinionated group guidelines, and one or more general libraries storing various other features that can be incorporated into a generated application.

Request handler 206 handles requests received from user device 104. The request can be generated via GUI module 152 based on user input to the GUI and provided to the application generator via transmission 161. The request can be, for example, to generate, revise, or update an application. Request handler 206 handles the request by determining which of the L1 template modules 201, L2 template modules 251, and libraries 124 to use. Request handler 206 can include handler business rules module 208 that apply rules to solicit information from the user for determining which L1 template modules 201 or L2 templates modules 251 to use by sending prompts at transmission 163 to user device 104 and to invoke the appropriate template modules for fulfilling the request.

Each of the L1 template modules 201 includes an L1 template collection 210, an L1 parameter module 214, and an L1 template business rules module. When the L1 template module 201 is an L1 platform template module 202, the templates included in the L1 template collection 210 are platform L1 templates. When the template module 201 is an L1 component template module 204, the L1 templates included in the L1 template collection 210 are component L1 templates. L1 template business rules module 220 applies rules for selecting one or more L1 templates to use and to solicit L1 parameter information from the user for entering information into parameters fields included with the L1 templates. The parameter fields can be configured to hold content, such as widgets (e.g., a graph, icon, table, etc.), text, graphics, photographs or videos. The parameter fields can also be configured to hold data that will be applied to the template, such as a title, a style, a color, a border, etc. Whenever further information is needed from the user by the business rules, request handler 206 prompts the user for the information via transmissions 163.

Upon receiving a request, request handler 206 applies business rules module 208 to solicit information needed for fulfilling a task identified by the request. When the request is to generate a software application, the request handler 206 solicits identification of an OGG set to be used (if more than one OGG set is available) and the platform device(s) for which the application is to be created. When the task is to revise an application, the request handler 206 solicits identification of the application(s) to be revised and the revisions to be performed. The same revision can be requested for multiple applications, such as applications for different platforms. When the task is to update an application, request handler 206 solicits identification of the application(s) and confirmation of the library updates that are to be applied to the identified application(s). The same updates can be requested for multiple applications, such as applications for different platforms.

With regard to generation of a new application (or multiple applications for different platforms), L1 template business rules module 220 selects each L1 platform template module 202 that corresponds to the platform(s) selected by the user. For each selected L1 platform template module 202, one or more L1 templates are selected from the L1 template collection 210 in accordance with the selected OGG set selected, since the OGG set can dictate different requirements for the L1 templates to be selected.

The selected OGG set can include an L1 OGG set, an L2 OGG set, an L1 scaffolding set, and an L2 scaffolding set. The L1 OGG set is used to determine architecture of the application by configuring structure of a base application folder by applying the appropriate L1 platform template module 202 that is consistent with the L1 OGG set, selecting which external libraries to add, selecting L1 templates from the corresponding L1 template collection 210, and selecting other base architecture parameters, such as development environment, language, code guidelines, software dependency list and development and deployment best practices. The base structure is then selected and the selected L1 templates completed.

The L2 OGG set is then used to select appropriate one or more L2 component template modules 250, select L2 templates from the corresponding L2 template collection 260, and provide candidate L2 parameter information from which a user can select L2 parameter information to insert in parameter fields of the L2 templates.

The L1 scaffolding set is used by scaffolding tool 126 to select L1 scaffolding parameters, including the application folder structure to be used, select any external libraries to be accessed, select base architecture parameters to be applied, such as development environment, language, code guidelines, a list of software dependency, and development and deployment guidelines. The scaffolding tool 126 applies the selected L1 scaffolding parameters to completed L1 templates to form a base structure.

Scaffolding tool 126 can further form the base structure by adding a CLI software function to the base structure. The CLI software function is configured to allow execution of a test platform for each platform requested by the user on a user device, wherein the test platform executes in a development mode that allows a user to execute the test platform line-by-line, modify per line, and re-execute the test platform, all under control of the user. The platform will run on the user device in a development mode (e.g., in which the user can change, modify, and re-execute the code at will).

The L2 scaffolding set is used by scaffolding tool 126 to select L2 scaffolding parameters and applies the L2 scaffolding parameters to completed L2 templates to form an L2 structure. Scaffolding tool can generate the application folder structure by applying the L2 structure on top of the base structure. Formation of the base folder and L2 folder and generation of the application folder structure can be performed transparent to the user without any user interaction.

For example, when creating a mobile application, the L1 OGG set determines UX/UI for mobile style, which is used to form a single base structure for the application folder structure without backend. Scaffolding tool 126 builds software for the base folder based on the completed templates, wherein the base folder provides a native mobile application that is configured to be installed on a mobile phone (for operation with one or more operating systems, e.g., Android or iOS).

For example, an L1 platform template module 202 for a mobile platform consults OGG library 146 and optionally general libraries 148 to determine requirements for at least one of software architecture, level of testing, and accessibility requirements. L1 platform templates are selected from L1 template collection 210, wherein each L1 platform template includes parameter fields into which L1 parameter information is entered once solicited from the user via the GUI. L1 parameter module 214 applies rules provided by L1 template business rules module 220 to determine which parameter fields of the selected L1 platform templates need L1 parameter information and instructs L1 parameter module 214 to send a prompt to the GUI of user device 104 for the needed L1 parameter information. L1 parameter module 214 can output prompt requests for the L1 parameter information, such as to prompt the user to enter text or select from a menu of choices of candidate L1 parameter information or to fill in a text field.

The GUI receives the prompt requests and prompts the user per the prompt requests, such as by providing a text entry field and/or a menu of selections. The L1 template can have parameter fields for, e.g., application name, style and layout, name of project to which the application is associated, user environment factors (e.g., identification of network connection), etc. The user can be prompted to enter the L1 parameter information in each of these fields. Text fields can be provided for the user to enter text, such as for application or project name. A menu of selection can be provided for other L1 parameter information in which the user chooses from a list, such as for selection of a style and layout of the application or environment factors. L1 parameter module 214 can access libraries 124, such as OGG library 146 for providing menu selections that are consistent with the L1 OGG set.

Libraries 124 includes a widgets library 142, a styles library 144, and an OGG library 146, and general libraries 148. Once all of the L1 templates are provided with the L1 parameter information needed, each appropriate level 2 component template module 252 is invoked. Examples of level 2 component template modules 252 include authentication, page, user management, API connection, widget extension, and authorization L2 modules.

Similar to the procedure with L1 platform template modules 202, for each L2 component template module 250, one or more L2 component templates are selected from L2 template collection 260 in accordance with the L2 OGG set, since the L2 OGG set can dictate different requirements for the L2 component templates to be selected. For example, the component L2 templates selected have a layout that is compliant with the L2 OGG set. At an L2 component level, for each appropriate L2 component template module 250 invoked, the L2 OGG set can extend the application folder structure using scaffolding tool 126 by adding a new folder per page for better code organization, configure the selected widgets that are associated with UX and/or UI, following security code guidelines, following best practice guidelines at the code level, and adding testing mechanisms.

The L2 OGG set provides guidelines that ensure coherence and compatibility between other files and folders generated through invocation of another appropriate L2 component template module 250. Files can be manipulated in order to link multiple L2 component templates associated with the same or different appropriate L2 component template modules 250.

The corresponding L2 template business rules module 262 determines which parameters fields of the selected component L2 templates need L2 parameter information and instructs L2 parameter module 264 to send a prompt to the GUI of user device 104 for the needed L2 parameter information. The prompt can include candidate L2 parameter information from which the user can choose, such as via a menu. The candidate L2 parameter information is obtained from libraries 124 based on the L2 OGG set.

Text fields can be provided for the user to enter text, such as for page or widget name. A menu of selection can be provided for other L2 parameter information in which the user chooses from a menu. One example menu can be used for selection of layout of a page or layout of a widget. This menu can be presented, for example, as a list of icons illustrating a layout of the page or widget. Another example menu can be used for selection of services to be added to the software application, such as authentication, external server connection, user management, language service, etc. This menu can be presented, for example, as a checklist in which the user can check a checkbox that corresponds to a service to be selected. L2 parameter module 264 can access libraries 124, such as OGG library 146 for providing menu selections that are consistent with the L2 OGG set.

An L2 component template module 250 for authentication and authorization consults OGG library entries for security requirements specified by the L2 OGG set and selects L2 templates that implement the security requirements.

For example, an L2 component template module 250 for the pages consults styles library to select a style that is consistent with the L2 OGG set. Each page is provided with a "look and feel" based on the style. For example, the style can determine colors and shading (e.g., used for borders, backgrounds and widgets) and font (including size and color, used for text).

Each L2 page template can have parameter fields into which parameter information is entered by the user via the GUI. L2 parameter module 264 can output prompt requests for the parameter information, such as to prompt the user to enter text, upload data, select widgets, and/or select from a menu. The GUI receives the prompt requests and prompts the user per the prompt requests, such as by providing a text entry field, an upload tool, and/or a menu from which to select. Once the selected L2 template(s) for each of the L2 component template modules 252 are completed by insertion of the user-solicited parameter information into the parameter fields or application to the L2 template, the selected L1 and L2 template(s) are provided to the scaffolding tool 126, which forms the completed platform and component templates into files and assembles the files into a folder structure.

The L2 scaffolding set is used by scaffolding tool 126 to select L2 scaffolding parameters, similar to selection of L1 scaffolding parameters. The scaffolding tool 126 applies the selected L2 scaffolding parameters to completed L2 templates to form an L2 structure and generate the application folder structure by building the L2 structure on top of the base structure.

The application folder structure is then provided to user device 104. User device 204 can use application manager module 154 to execute the files in the application folder structure using the CLI software function to allow the test platform for each platform requested by the user to execute using the CLI. Additionally, the user can use any integrated development environment (IDE) to edit any line of code of the application folder structure.

When the request is to revise an existing application, after the request handler 206 solicits identification of the application(s) to be revised and the revisions to be performed, the handler business rules module 208 determines the selected OGG set and whether to start with a L1 platform template module 202 or a L1 component template module 204.

When the revisions to be performed include adding a new platform, request handler 206 selects the L1 platform template module 202 for the platform to be added. An application folder structure is generated in a similar manner to generating an original application folder structure for a software application for the first time. Once the software application for the new platform to be added is generated, the user is prompted with guideline to connect the newly generated software application for the new platform to the existing software application.

When the revisions to be performed include revising a component of the existing application, the request handler 206 selects the L1 component template module 204 for the component to be revised and completes applicable L1 component templates by applying the L1 OGG set of the selected OGG set. An L1 structure is formed by scaffolding tool 126 based on L1 scaffolding parameters selected using L1 scaffolding set of the selected OGG set. Scaffolding tool 126 applies the selected L1 scaffolding parameters to the completed L1 component templates to form an L1 component structure L2 templates are completed by applying L2 OGG and soliciting user input and assigned to the new platform folder.

An L2 structure is formed by scaffolding tool 126 based on L2 scaffolding parameters selected using L2 scaffolding set of the selected OGG set. Scaffolding tool 126 applies the selected L2 scaffolding parameters to completed platform L2 templates to form an L2 platform structure. Scaffolding tool 126 generates a new application folder structure by building the L2 component structure on top of the L1 platform structure.

The user is prompted with guideline to connect the newly generated software application for the new component to the existing software application.

Administrator system 106 includes a user interface 170 via which an administrator user can enter updates to libraries 124 or template module tool 122. For example, at flow 181, the administrator user can enter updates to business rules in the template business rules module of any of the level 1 platform template modules 202, level 1 component template modules 204, level 2 component template modules 250, or level 2 platform template modules 252.

The update to the business rules can support a new page layout that was added to OGG library 146 by providing the new page layout with the candidate parameter information for completing an L1 or L2 component template; support a new style in styles library 144 by providing the new style with the candidate parameter information for completing an L1 or L2 platform template; support a new widget that was added to widgets library 142 by providing the new widget with the candidate parameter information for completing an L1 or L2 component template; support a new platform option which has been added to available level 1 platforms for generating software applications to work with a new framework by providing the new platform as an option presented by handler business rules module 208.

In another example, at flow 183, the administrator user can enter updates to any of the libraries, such as for adding, removing, or changing entries in the widgets, styles, or OGG libraries. In another example, at flow 185, the user can enter updates to any of the L? template collection 210, such as for adding, removing, or changing entries to any of the templates in L1 template collection 210 or L2 template collection 260 for platforms or components (e.g., of any of the L1 platform template modules 202, level 1 component template modules 204, level 2 component template modules 250, or level 2 platform template modules 252).

Figure 3:
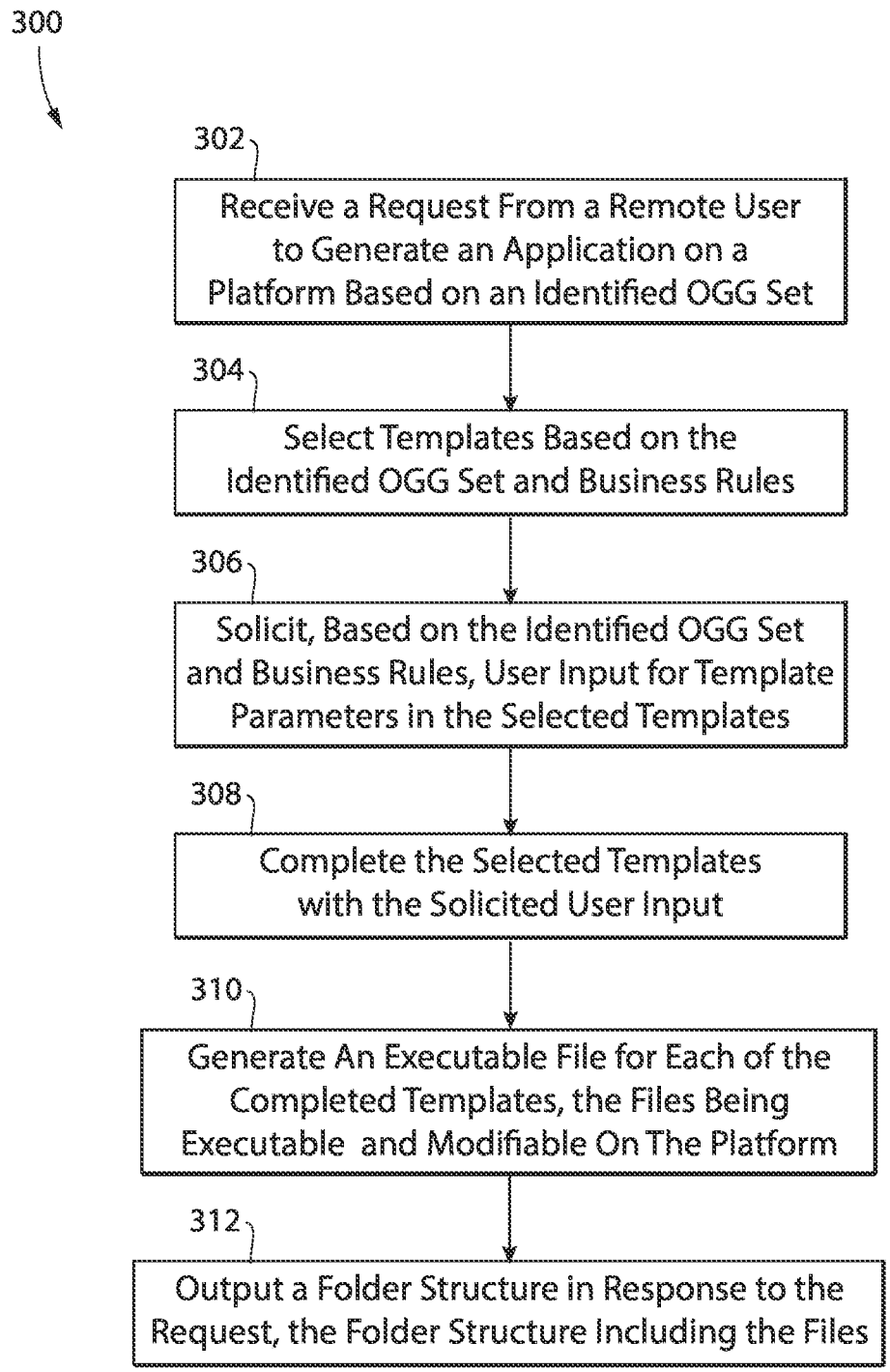
FIG. 3 is a flowchart of an example method of generating a software application, in accordance with embodiments of the disclosure.
Figure 4:
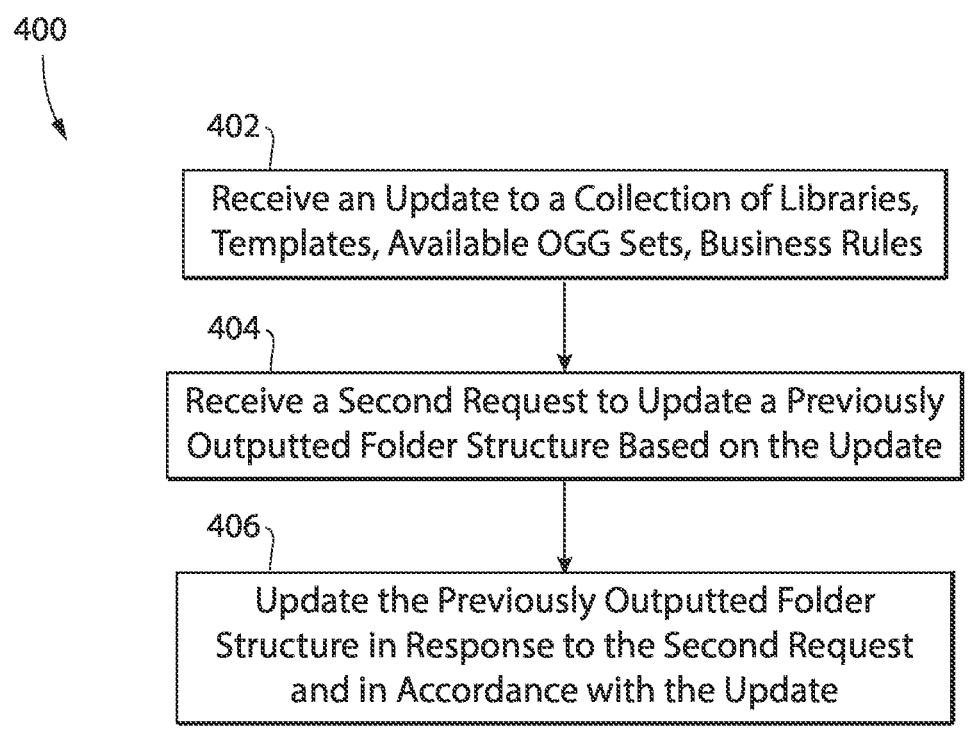
FIG. 4 is a flowchart of updating a generated software application, in accordance with embodiments of the disclosure.
Figure 5:
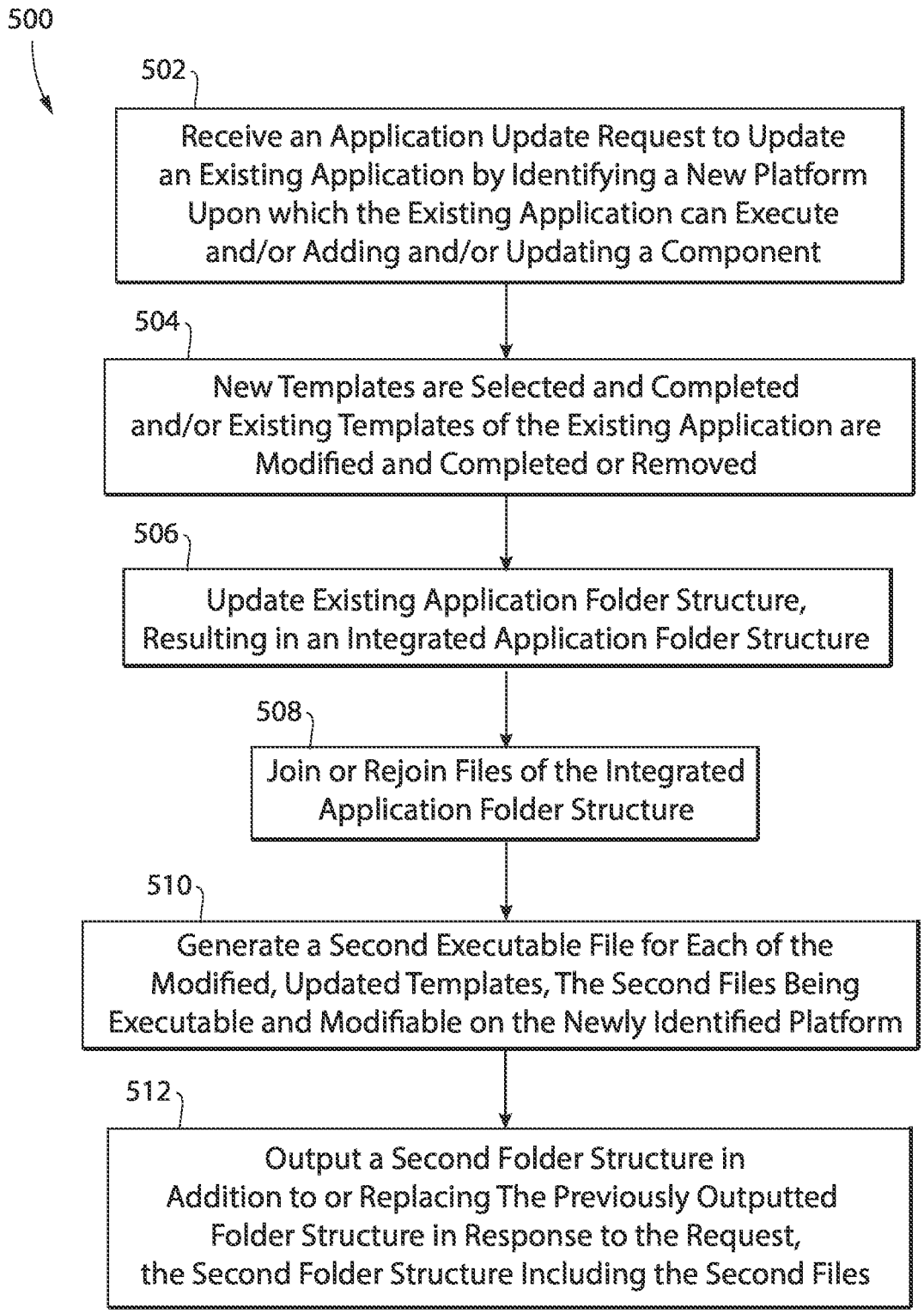
FIG. 5 is a flowchart of an example method of expanding a generated software application to execute on an additional platform, in accordance with embodiments of the disclosure.

FIGS. 3-5 show exemplary and non-limiting flowcharts illustrating a method for generating software applications, in accordance with certain illustrated embodiments. The method can be performed by a networked device, such as any of application generator 102 shown in FIG. 1. Before turning to the description of FIGS. 3-5, it is noted that the flowcharts in FIGS. 3-5 show examples in which operational blocks are carried out in a particular order, as indicated by the lines connecting the blocks, but the various blocks shown in these flowcharts can be performed in a different order, or in a different combination or sub-combination. It should be appreciated that in some embodiments some of the blocks described below may be combined into a single block. In some embodiments, one or more additional blocks may be included. In some embodiments, one or more of the blocks can be omitted.

With reference to FIG. 3, flowchart 300 shows an example method of generating a customized software application that fulfills a set of OGGs. At block 302, a request is received from a remote user to generate a software application on a platform based on an identified OGG set. The request can select the one or more platforms from a plurality of available platforms, such as a mobile platform, a desktop platform, a web platform, a server platform, and a cloud platform. Additionally, the OGG set can be selected from multiple available OGG sets.

At block 304, templates are selected based on the identified OGG set and business rules. As shown in FIGS. 2A and 2B, the templates are selected from collections of templates associated with different template modules, such as template modules 201. The template modules 201 can be provided at different levels, wherein a higher level can invoke a lower level. Each template module can be dedicated to configuring a different aspect of the software application, such as configuring the software application to execute on a specific platform or configuring a component of the software application, such as authentication or authorization for securing the software application, or pages to be generated when the software application executes. Template modules can be selected based on the identified OGG set and business rules. Templates of template collections associated with the selected template modules can be selected based on the identified OGG set and business rules associated with the corresponding selected template module. The templates and the business rules associated with the plurality of template modules are each configurable by an operator after deployment of the application generator, e.g., deployment at a customer site, as opposed to at time of manufacture or production.

At block 306, user input for template parameters in the selected templates is solicited based on the identified OGG set and business rules. The user input is solicited via a GUI provided by a remote device used operated by the user. The user input is solicited based on the identified set of opinionated group guidelines and in accordance with the business rules of the corresponding selected template module.

For example, a collection of libraries can be accessed, such as libraries 124 shown in FIG. 1. The libraries can store parameter information for the templates includes with the template modules, such as in widgets library 142 or styles library 144 shown in FIG. 1. The libraries can be configured by the operator after deployment. Candidate parameter information can be selected from the libraries in accordance with the identified OGGs. The user can be prompted via the GUI to select from presented candidate parameter information. The user can also enter freehand parameter information, such as by entering text or uploading data (e.g., photographs, graphics, videos). The user's selections are provided as a response to the prompts can be used for insertion into the parameter fields and/or application to the templates.

At block 308, the selected templates are completed based on the solicited user input. For example, the user input can be entered into parameter fields of the selected templates. At block 310, an executable file for each of the completed templates is generated. The files are executable on the platform for which they were generated. The files can be edited, such as at the command level, by the user. In one or more embodiments, generating the file for each of the modified templates is performed based on the identified set of opinionated group guidelines set.

At block 312, an application folder structure is output in response to the request, wherein the application folder structure includes the files.

The template modules can be designed to configure authentication and/or authorization for executing the software application, to pre-configure access by the software application to data sources for accessing data, configure deployment of the software application, configure data storage for the software application to store data during execution of the software application, and configure one or more displayable pages to be generated upon execution of the software application.

In one or more embodiments, the opinionated group guidelines define at least one characteristic of the software application. The at least one characteristic can be selected from the group of characteristics including UX, UI, level of testing, security, architecture, and accessibility.

The request from the remote user can include a selection of a style selection from a variety of available styles. The style selection will also govern which template modules or templates are selected, and/or which template information choices are available for the user to select via the GUI.

With reference to FIG. 4, flowchart 400 shows an example method for updating a previously outputted application folder structure for an existing application. At block 402 a system update is received by the application generator 102 from an operator. The system update is received after deployment of the application generator 102. The system update is configured to update at least one of the collection of libraries, the collections of templates associated with the group of template modules, available opinionated group guideline sets, and business rules associated with the group of template modules.

At block 404, an application update request is received to update a previously outputted application folder structure for an existing application based on the system update. At block 406, the previously outputted application folder structure is updated in response to the application update request and in accordance with the system update.

With reference to FIG. 5, flowchart 500 shows an example method for updating a previously outputted, existing application folder structure for an existing application by identifying one or more new platforms upon which the existing application can execute or adding one or more new component(s) to, or updating one or more components of, an existing platform of the existing application. At block 502, an application update request is received. The application update request requests an update to the existing application by identifying the new platform(s) upon which it is desired for the corresponding application to execute and/or the components to be added and/or updated. At block 504, templates for adding the new platform(s) and component(s) are selected and completed (e.g., by soliciting user input) and/or existing templates of the existing application are modified and completed. At block 506, the existing application folder structure is updated by updating files corresponding to added and/or updated templates based on the update request, resulting in an integrated application folder structure. At block 508, files of the integrated application folder structure are joined and/or rejoined to provide appropriate connectivity between files in the integrated application folder that were affected by the updates performed.

In one or more embodiments, blocks 504, 506, and/or 508 can be performed by interacting with application generator 102 and following prompts provided by application generator. A new application folder structure is created to hold updates. The updates are files generated by scaffolding tool 126 based on the new templates for the newly added platforms, updated components, and/or new components. Both the existing application folder structure for the existing application and the updated application folder structure for the updates can be downloaded to user device 104. Application manager module 154 can perform an integration procedure to integrate the existing application folder structure and the updated storage folder into the integrated application file structure. The integration procedure can include prompting the user to perform actions or make selections, replacing or updating files in (a copy of or the original) existing application folder structure that correspond to templates which were updated with corresponding files in the updated application folder structure, adding or removing files from the updated application folder structure that correspond to added or removed templates, and joining or rejoining all files that were updated, replaced, added to, or affected by files removed from the existing application folder structure, resulting in an integrated application folder structure. The prompts can be provided via the user interface provided by CLI module 156.

In one or more embodiments, the addition of a platform, addition of a component, and/or update of a component is performed using a CLI provided by CLI module 156. The existing application folder structure is stored locally and is updated using the CLI In this embodiment, the updates are made directly to the existing application (or a copy thereof) without creating the updated application folder structure. The application manager module 154 manages joining or rejoining all files that were updated, replaced, added to, or affected by files removed from the existing application folder structure, resulting in an integrated application folder structure. Any related user prompts for the integration procedure are provided via the CLI and by a generated documentation file.

In one or more embodiments in which a local version of application generator 102 is provided as a local module resident on user device 104, the existing and updated application folder structures may be downloaded from the remote application generator 102 and/or may already be local to the user device 104. The integration procedure is performed locally by application generator 102. The integration procedure uses a GUI provided by the local version of application generator 102.

In one or more embodiments in which a local version of application generator 102 is provided as a local module resident on user device 104, the existing application folder structure is stored locally and is updated using the GUI provided by application generator 102. In this embodiment, the updates are made directly to the existing application (or a copy thereof) without creating the updated application folder structure.

Figure 6:
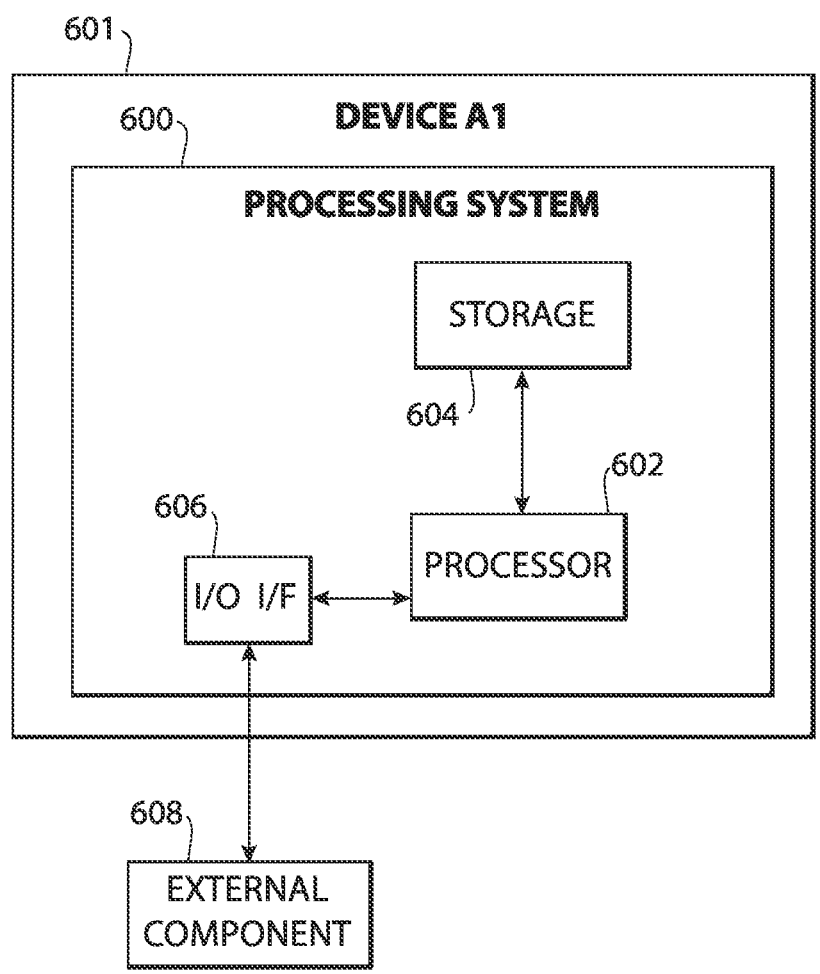
FIG. 6 is a block diagram of an exemplary computer system that implements an application generator, user device, and administrative device shown in FIG. 1, in accordance with embodiments of the disclosure.

With reference to FIG. 6, a block diagram of an example computing system 600 is shown, which provides an example configuration of a device A1 implemented using an example processing system. Device A1 can be any smart element included in application development system 100, such as application generator 102, user device 104, and administrative system 106. Additionally, all or portions of device A1 could be configured as software, and computing system 600 could represent such portions. Computing system 600 is only one example of a suitable system and is not intended to suggest any limitation as to the scope of use or functionality of embodiments of the disclosure described herein. Computing system 600 can be implemented using hardware, software, and/or firmware. Regardless, computing system 600 is capable of being implemented and/or performing functionality as set forth in the disclosure.

Computing system 600 is shown in the form of a general-purpose computing device. Computing system 600 includes a processing device 602, memory 604, an input/output (I/O)

interface (I/F) 606 that can communicate with an internal component, such as a user interface 610, and optionally an external component 608.

The processing device 602 can include, for example, a programmable logic device (PLD), microprocessor, DSP, a microcontroller, an FPGA, an ASIC, and/or other discrete or integrated logic circuitry having similar processing capabilities.

The processing device 602 and the memory 604 can be included in components provided in the FPGA, ASIC, microcontroller, or microprocessor, for example. Memory 604 can include, for example, volatile and non-volatile memory for storing data temporarily or long term, and for storing programmable instructions executable by the processing device 602. Memory 604 can be a removable (e.g., portable) memory for storage of program instructions. I/O I/F 606 can include an interface and/or conductors to couple to the one or more internal components 610 and/or external components 608.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of device A1 may be implemented or executed by one or more computer systems, such as a microprocessor. Each computer system 600 can be included within device A1 or multiple instances thereof. In the example shown, computer system is embedded in device A1. In various embodiments, computer system 600 may include one or more of a microprocessor, an FPGA, application specific integrated circuit (ASIC), microcontroller. The computer system 600 can be provided as an embedded device. Portions of the computer system 600 can be provided externally, such by way of a centralized computer, a data concentrator, a cockpit computing device controls display of gap status, e.g., notifications about the gap or alerts, or the like.

Computer system 600 is only one example of a suitable system and is not intended to suggest any limitation as to the scope of use or functionality of embodiments of the disclosure described herein. Regardless, computer system 600 is capable of being implemented and/or performing any of the functionality set forth hereinabove.

Computer system 600 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method for generating a software application comprising:
   providing a plurality of template modules, wherein each template module has an associated collection of templates and business rules that are configurable by an operator, and wherein each template module once configured by the operator is designed to configure a different aspect of the software application that can be potentially generated from the template module for a particular set of opinionated group guidelines (OGG set) and for a particular platform;
   receiving, by interacting with a graphical user interface (GUI) of a remote user device, a request to generate the software application executable on at least one platform of multiple possible platforms, the request including identification of an OGG set for the software application and identification of the at least one platform;
   automatically selecting a group of one or more template modules from the plurality of template modules based on the identified OGG set and the identified at least one platform, each template module being dedicated to configuring the different aspect of the software application;
   for each template module of the selected group of one or more template modules, automatically selecting templates from the associated collection of templates based on the identified OGG set and the business rules of the template module;
   for each selected template, automatically soliciting user input via the GUI for the selected template's template parameters, wherein solicitation of the user input is based on the identified OGG set and the business rules of the corresponding template module, and wherein the template parameters include application name, layout type, page names for one or more displayable pages to be generated upon execution of a corresponding executable file based on the corresponding template, and properties for each of the one or more displayable pages;
   automatically completing the selected templates based on the solicited user input;
   automatically generating an executable file for each of the completed templates, wherein the executable files are generated to be executable by the at least one platform identified as the requested software application; and
   outputting an application folder structure in response to the request, the application folder structure including the executable files.

2. The method of claim 1, wherein automatically soliciting the user input via the GUI for template parameters of one of the selected templates includes:
   accessing a collection of libraries storing parameter information for templates of the template collections associated with the plurality of template modules of the templates, wherein the collection of libraries is configurable by the operator after deployment;
   selecting candidate parameter information of the stored parameter information that are designated by the business rules associated with the template module; and
   prompting a user via the GUI to make selections from the candidate parameter information incorporating the selections into the template.

3. The method of claim 2, further comprising:
   receiving an update from an operator, after deployment of a system for generating the software application, to at least one of the collection of libraries, the collections of templates associated with the group of template modules, available OGG sets, and business rules associated with the group of template modules;
   receiving a second request to update a previously outputted application folder structure based on the update; and
   updating the previously outputted application folder structure in response to the second request and in accordance with the updates.

4. The method of claim 1, wherein the executable files are configured to be edited at a command level after being output with the application folder structure.

5. The method of claim 1, wherein the selected group of one or more template modules includes modules for configuring authentication and/or authorization for executing the software application; pre-configuring access to data sources for accessing data; configuring deployment of the software application; configuring data storage for storing data during execution of the software application; and configuring one or more displayable pages to be generated upon execution of the software application.

6. The method of claim 1, wherein the OGG set defines at least one characteristic of the software application including at least one of user experience (UX) and user interface (UI) and at least one of level of testing and security.

7. The method of claim 1, wherein the request further includes a style selection that selects from a plurality of candidate styles, and the group of one or more template modules is selected based on the style selection.

8. The method of claim 1, further comprising:
   receiving an application update request, the application update request requesting an update to an existing application folder structure that was previously output, wherein the application update request identifies one or more new platforms upon which it is desired for the software application that corresponds to the existing application folder structure to execute, one or more software components of the existing application to be updated, and/or one or more new software components to be added to the existing application;

automatically selecting and completing new templates for adding the one or more new platforms and/or the one or more new software components, and/or removing and/or modifying the one or more existing templates of the existing application for updating the one or more software components;

automatically updating the existing application folder structure by updating executable files corresponding to the added new templates and/or the removed and/or updated existing templates based on the update request, resulting in an integrated application folder structure; and automatically joining and/or rejoining executable files of the integrated application folder structure to provide appropriate connectivity between executable files in the integrated application folder that were affected by the updating.

9. The method of claim 8, wherein updating the executable file for each of the modified templates is performed based on the identified OGG set.

10. The method of claim 1, wherein the at least one platform includes one or more of a mobile platform, a desktop platform, a web platform, a server platform, and a cloud platform.

11. The method of claim 1, wherein the plurality of template modules include one or more template modules of a higher level and one or more template modules of a lower level, wherein a selected template included in the one or more templates of the higher level is configured to cause invocation of a template module included in the one or more templates of the lower level.

12. A software application generator comprising:
a memory configured to store a plurality of programmable instructions; and
at least one processing device in communication with the memory, wherein the at least one processing device, upon execution of the plurality of programmable instructions is configured to:
provide a plurality of template modules, wherein each template module has an associated collection of templates and business rules that are configurable by an operator, and wherein each template module once configured by the operator is designed to configure a different aspect of the software application that can be potentially generated from the template module for a particular set of opinionated group guidelines (OGG set) and for a particular platform;
receive, by interacting with a graphical user interface (GUI) of a remote user device, a request to generate the software application executable on at least one platform of multiple possible platforms, the request including identification of an OGG set for the software application and identification of the at least one platform;
automatically select a group of one or more template modules from the plurality of template modules based on the identified OGG set and the identified at least one platform, each template module being dedicated to configuring the different aspect of the software application;
for each template module of the selected group of one or more template modules, automatically select, without user input, templates from the associated collection of templates being based on the identified OGG set and the business rules of the template module;
for each selected template, automatically solicit user input via the GUI for the selected template's template parameters, wherein solicitation of the user input is based on the identified OGG set and the business rules of the corresponding template module, and wherein the template parameters include application name, layout type, page names for one or more displayable pages to be generated upon execution of a corresponding executable file based on the corresponding template, and properties for each of the one or more displayable pages;
automatically complete the selected templates based on the solicited user input;
automatically generate an executable file for each of the completed templates, wherein the executable files are generated to be executable by the at least one platform identified as the requested software application; and
output an application folder structure in response to the request, the application folder structure including the executable files.

13. The software application generator of claim 12, wherein automatically soliciting the user input via the GUI for template parameters of one of the selected templates includes:
accessing a collection of libraries storing parameter information for templates of the template collections associated with the plurality of template modules of the templates, wherein the collection of libraries is configurable by the operator after deployment of the software application generator;
selecting candidate parameter information of the stored parameter information that are designated by the business rules associated with the template module; and
prompting a user via the GUI to make selections from the candidate parameter information incorporating the selections into the template.

14. The software application generator of claim 13, wherein the at least one platform includes one or more of a mobile platform, a desktop platform, a web platform, a server platform, and a cloud platform.

15. The software application generator of claim 13, wherein the at least one processing device, upon execution of the plurality of programmable instructions, is further configured to:
receive an update from an operator after deployment to at least one of the collection of libraries, the collections of templates associated with the group of template modules, available opinionated group guideline sets, and business rules associated with the group of template modules;
receive a second request to update a previously outputted application folder structure based on the update; and
update the previously outputted application folder structure in response to the second request and in accordance with the updates.

16. The software application generator of claim 12, wherein the selected group of one or more template modules includes modules for configuring authentication and/or authorization for executing the software application; pre-configuring access to data sources for accessing data; configuring deployment of the software application; configuring data storage for storing data during execution of the software application; and configuring one or more displayable pages to be generated upon execution of the software application.

17. The software application generator of claim 12, wherein the OGG set defines at least one characteristic of the software application including at least one of user experience (UX) and user interface (UI) and at least one of level of testing and security.

18. The software application generator of claim 12, wherein the request further includes a style selection that selects from a plurality of candidate styles, and the group of one or more template modules is selected based on the style selection.

19. The software application generator of claim 12, wherein the at least one processing device, upon execution of the plurality of programmable instructions, is further configured to:
receive an application update request, the application update request requesting an update to an existing application folder structure that was previously output, wherein the application update request identifies one or more new platforms upon which it is desired for the software application that corresponds to the existing application folder structure to execute, one or more software components of the existing application to be updated and/or one or more new software components to be added to the existing application;
automatically select and complete new templates for adding the one or more new platforms and/or the one or more new software components, and/or remove and/or modify the one or more existing templates of the existing application for updating the one or more software components;
automatically update the existing application folder structure by updating executable files corresponding to the added new templates and/or the removed, and/or updated existing templates based on the update request, resulting in an integrated application folder structure; and
automatically join and/or rejoin the executable files of the integrated application folder structure to provide appropriate connectivity between executable files in the integrated application folder that were affected by the updating.

20. A non-transitory computer readable storage medium having one or more computer programs embedded therein, which when executed by a computer system, cause the computer system to:
provide a plurality of template modules, wherein each template module has an associated collection of templates and business rules that are configurable by an operator, and wherein each template module once configured by the operator is designed to configure a different aspect of a software application that can be potentially generated from the template module for a particular set of opinionated group guidelines (OGG set) and for a particular platform, wherein the OGG set defines at least one characteristic of the software application including at least one of user experience (UX) and user interface (UI) and at least one of level of testing and security;
receive, by interacting with a graphical user interface (GUI) of a remote user device, a request to generate the software application executable on at least one platform of multiple possible platforms, the request including identification of an OGG set for the software application and identification of the at least one platform;
automatically select a group of one or more template modules from the plurality of template modules based on the identified OGG set and the identified at least one platform, each template module being dedicated to configuring the different aspect of the software application;
for each template module of the selected group of one or more template modules, automatically select, without user input, templates from the associated collection of templates being based on the identified OGG set and business rules of the template module;
for each selected template, automatically solicit user input via the GUI for the selected template's template parameters, wherein solicitation of the user input is based on the identified OGG set and the business rules of the corresponding template module, and wherein the template parameters include application name, layout type, page names for one or more displayable pages to be generated upon execution of a corresponding executable file based on the corresponding template, and properties for each of the one or more displayable pages;
automatically complete the selected templates based on the solicited user input;
automatically generate an executable file for each of the completed templates, wherein the executable files are generated to be executable by the at least one platform identified as the requested software application; and
output an application folder structure in response to the request, the application folder structure including the executable files.

* * * * *